US011280300B2

(12) United States Patent
Barbolini et al.

(10) Patent No.: US 11,280,300 B2
(45) Date of Patent: Mar. 22, 2022

(54) AIR INTAKE DEVICE WITH A VARIABLE-LENGTH INTAKE DUCT AND A SEPARATE CENTERING DEVICE

(71) Applicant: Röchling Automotive SE & Co. KG, Mannheim (DE)

(72) Inventors: Marco Barbolini, Bolzano (IT); Alberto Migliorini, Caselette (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 17/307,257

(22) Filed: May 4, 2021

(65) Prior Publication Data

US 2021/0348583 A1 Nov. 11, 2021

(30) Foreign Application Priority Data

May 7, 2020 (DE) ..................... 10 2020 112 461.9

(51) Int. Cl.
*F02M 35/10* (2006.01)
*F16J 15/06* (2006.01)

(52) U.S. Cl.
CPC ............... *F02M 35/10144* (2013.01); *F02M 35/10091* (2013.01); *F16J 15/06* (2013.01)

(58) Field of Classification Search
CPC ....... F02M 35/10144; F02M 35/10078; F02M 35/10137; F02M 35/10085; F16J 15/06; F16J 15/061; F16J 15/062
See application file for complete search history.

(56) References Cited

U.S. PATENT DOCUMENTS

| 4,759,320 A * | 7/1988 | Fujii | ................... F02B 27/0294 |
| | | | 123/184.55 |
| 4,890,586 A * | 1/1990 | Fujii | ................... F02B 27/0215 |
| | | | 123/184.55 |

(Continued)

FOREIGN PATENT DOCUMENTS

| DE | 19634913 A1 | 8/1996 |
| DE | 19728600 A1 | 7/1997 |
| DE | 10228569 A1 | 1/2004 |

OTHER PUBLICATIONS

German Search Report for corresponding DE 10 2020 112 461.9 dated Jan. 13, 2021, 9 pgs.

(Continued)

*Primary Examiner* — Jacob M Amick
(74) *Attorney, Agent, or Firm* — Rankin, Hill & Clark LLP (57) ABSTRACT

An air intake device with a variable-length intake duct, comprising: a base duct component with a base duct, configured for the passage of intake air through the base duct component, an extension duct component with an extension duct, configured for the passage of intake air through the extension duct component, a guidance arrangement which guides the extension duct component and the base duct component to relative movement between a first operating position and a second operating position, wherein in the first operating position the base duct and the extension duct form, in mutually prolonging abutment, a continuous duct section, and wherein in the second operating position the extension duct is arranged at a distance from the base duct, and a first centering arrangement which when the duct components approach the first operating position is configured to decrease a radial distance in relation to a virtual base duct path conceived as passing centrally through the base duct between an end section of the base duct facing towards the (Continued)

extension duct component and an end section of the extension duct facing towards the base duct component, wherein the first centering arrangement is configured as separate from the base duct and from the extension duct.

20 Claims, 6 Drawing Sheets

(56) References Cited

U.S. PATENT DOCUMENTS

| | | | |
|---|---|---|---|
| 6,408,810 B1* | 6/2002 | Leipelt | F02B 27/0236 |
| | | | 123/184.55 |
| 7,640,909 B2 | 1/2010 | Sudoh et al. | |
| 2007/0240667 A1* | 10/2007 | Sudoh | F02B 27/0231 |
| | | | 123/184.55 |
| 2009/0165740 A1* | 7/2009 | Kubo | F02M 35/116 |
| | | | 123/184.55 |

OTHER PUBLICATIONS

Espacenet Bibliographic data:DE 10228569 (A1), Published Jan. 22, 2004, 1 pg.
Espacenet Bibliographic data:DE 19634913 (A1), Published Aug. 29, 1996, 1 pg.
Espacenet Bibliographic data:DE 19728600 (A1), Published Jul. 4, 1997, 1 pg.

* cited by examiner

AIR INTAKE DEVICE WITH A VARIABLE-LENGTH INTAKE DUCT AND A SEPARATE CENTERING DEVICE

This application claims priority in German Patent Application DE 10 2020 112 461.9 filed on May 7, 2020, which is incorporated by reference herein.

This invention concerns an air intake device with a variable-length intake duct for an internal combustion engine, comprising:

A base duct component with a base duct extending along a virtual base duct path, configured for the passage of intake air along the base duct path through the base duct component, wherein the base duct path is conceived as passing centrally through the base duct, An extension duct component with an extension duct extending along a virtual extension duct path, configured for the passage of intake air along the extension duct path through the extension duct component, wherein the extension duct path is conceived as passing centrally through the extension duct, A guidance arrangement, which guides the extension duct component and the base duct component to relative movement between a first operating position and a second operating position, wherein in the first operating position the base duct and the extension duct form, in mutually prolonging abutment, a continuous common duct section extending along the base duct and the extension duct as part of the intake duct, and wherein in the second operating position the extension duct is arranged at a distance from the base duct, such that only the base duct forms part of the intake duct, and A first centering arrangement, which when the duct components approach the first operating position is configured to decrease a radial distance in relation to the base duct path between an end section of the base duct path facing towards the extension duct component and an end section of the extension duct path facing towards the base duct component.

BACKGROUND OF THE INVENTION

Such an air intake device is known from the publication DE 197 28 600 A1. It is used in order to modify the effective length of an air intake duct as a function of the rpm of an internal combustion engine designed to interact with the air intake device, by having an extension duct component attached to a base duct component or separating it from same. Usually, the effective length of the intake duct is decreased with increasing rpm of the internal combustion engine and increased with decreasing rpm.

In order to attach the extension duct component reliably to the base duct component of the air intake device known from DE 197 28 600 A1, the longitudinal ends of the duct components: extension duct component and base duct component that face each other, act when approaching each other as a centering device. The effective length of the centering device formed by the duct components themselves is short, such that the known duct components have to be guided towards each other highly accurately in order to ensure a correct first operating position of the extension duct component and base duct component. An incorrect relative position of the extension duct component and base duct component in the first operating position, deviating from the required position, is accompanied by disturbing noises during the air intake device's operation. Besides, the known duct components have to approach each other along a predetermined approach direction.

Since, moreover, the centering sections of the duct components not only center, but also have to conduct flowing air, the centering sections are designable only subject to compliance with constraints dictated by fluid mechanics and acoustics.

SUMMARY OF THE INVENTION

It is, therefore, the task of the present invention so to further develop the air intake device referred to at the beginning, that with a greater structural and kinematic degree of freedom of the duct components than in the state of the art it can be structured simply and offer reliably low-noise operation. This task is solved according to the invention by an air intake device referred to at the beginning, in which the first centering arrangement is configured as separate both from the base duct and from the extension duct.

Although the guidance arrangement can be configured for the guidance of a translational and/or rotational relative movement of the duct components, for reasons of a preferred low movement space requirement of a pivoting movement the guidance arrangement comprises preferentially a pivot bearing, in particular a radial bearing.

By envisaging the first centering arrangement as separate from the base duct and from the extension duct, the configuration of the first centering arrangement is not constrained by being subject to fluid mechanics and acoustic requirements. The effective length of the centering device along the relative movement route of the duct components can be increased, such that the guidance accuracy of the guidance arrangement no longer matters. As a result, a simply constructed quiet air intake device is realized.

The first and the later described second centering arrangement each define, in the first operating position, the position and the orientation of the base duct component relative to the extension duct component within predetermined tolerance parameters (e.g. positional tolerance and/or angular tolerance). In an especially preferential embodiment, the base duct component and/or the extension duct component is designed as an injection-molded component, wherein preferentially at least one section, a number of sections, or all sections in each case of the first and/or the later described second centering arrangement are configured integrally with the base duct component and/or the extension duct component.

Especially preferentially, for designing a compact air intake device, the first centering arrangement is arranged spatially between the guidance arrangement on the one hand and the base duct and the extension duct on the other, since due to lever effects a relatively small centering arrangement can act over a large range of the relative movement's route. Most notably in the preferential rotational relative movement of the duct components, in this way the centering arrangement has to extend only over a rotational movement angle common with the duct components, wherein due to the shorter distance to the guidance arrangement its dimension can turn out shorter than the relative movement route of the duct components.

In order to provide uniform support between the base duct and the extension duct, the air intake device preferentially comprises further a contact arrangement with a contact formation and a mating contact formation, wherein in the first operating position the abutment between the base duct and the extension duct is configured as an abutment of the contact formation against the mating contact formation, and wherein in the first operating position the contact formation and the mating contact formation are passed through by the common duct section. Here in particular the first centering arrangement is configured to be at a distance from the contact arrangement, such that there exists freedom of design to configure both the first centering arrangement and the contact arrangement each for its assigned purpose, while reducing their effect on each other.

In order further to increase the positional accuracy of the extension duct component relative to the base duct component in the first operating state, the contact arrangement can comprise a second centering arrangement configured as separate from the first centering arrangement, configured when the duct components approach the first operating position to decrease a radial distance in relation to the base duct path between the end section of the base duct path facing towards the extension duct component and the end section of the extension duct path facing towards the base duct component. The second centering arrangement, which preferentially is formed by end regions of the duct components that point towards each other, can exhibit a very short effective length due to the first centering arrangement already provided. Nevertheless, it can interact with first centering arrangement to increase the accuracy considerably when establishing the first operating position.

In order to decrease noise generation by air escaping undesirably between the base duct component and the extension duct component, the contact arrangement can comprise a gasket bearing surface configured at the contact formation and a gasket arranged at the mating contact formation, wherein in the first operating position the gasket bearing surface is in contact with the gasket. Due to the position of the duct components relative to each other which in the first operating position is defined by the first and optional second centering arrangement, the position of the gasket and the gasket bearing surface relative to each other is also defined, whereby an especially reliable tight abutment of the base duct against the extension duct is achieved.

The gasket can be protected against damage by the duct component not carrying the gasket, if the gasket is arranged at a distance from a longitudinal end located nearer to the gasket of the duct of the duct component carrying the gasket.

The gasket can be arranged to be well-secured against coming loose in a groove surrounding the common duct section in the first operating position. The groove consequently surrounds the duct path of the duct component carrying it and likewise a section of a virtual common duct path conceived as passing centrally through the common duct section. This safeguard against coming loose can be strengthened by having the groove exhibit at least one anchoring formation, in particular an anchoring projection protruding into the groove's volume and/or an anchoring recess enlarging the groove's volume. Thus, an anchoring projection can engage with the gasket and/or the gasket with an anchoring recess. The anchoring formation can be configured in relation to the duct of the duct component carrying the gasket as an overhang or recess extending in a radial direction or/and in a direction parallel to the course of the duct path associated with the duct, wherein preferentially one, several, or all anchoring formations of the at least one anchoring formation surround, in particular completely, the duct path associated with the duct.

Preferentially, at least one of the anchoring recesses penetrates through a surface bounding the groove, preferentially a groove bottom or a groove flank. In particular, at least one of the, a majority of, or all anchoring recesses can be configured as a passage aperture.

An especially reliable arrangement of the gasket at the mating contact formation can be achieved, if the gasket and the mating contact formation are manufactured in a two-component injection molding process. The material of the gasket exhibits preferentially a lower modulus of elasticity than the material of the mating contact formation.

The first centering device can maintain its function durably if the first and second operating positions are each end positions of the relative movement of the extension duct component and of the base duct component. Then the maximum relative movement route of the duct components is fixed over the whole service life of the air intake device.

The first centering arrangement can comprise a centering socket and a centering projection configured to engage with the centering socket, in particular a centering spike. The centering projection can engage with the centering socket over more than 15%, preferentially over more than 30%, more preferentially over more than 50%, especially preferentially over more than 75%, or over 100% of the relative movement route between the first and the second operating position, in order to achieve the longest possible effective lengths. In this way, the centering arrangement can also fulfil a guidance function during the approach of the two duct components towards each other. Consequently, the centering arrangement can be a combined centering and guidance arrangement. Then it exists in addition to the aforementioned guidance arrangement.

In an especially preferential embodiment, the aforementioned guidance arrangement and/or the centering and guidance arrangement is so configured that during a movement between the first and the second operating position, a movement path of a point of a duct component made of an extension duct component and base duct component considered to be moving lies in a movement surface inclined to the duct paths of the duct components, in particular a plane of movement. Preferentially, the movement surface is inclined to a tangent to the duct path of the respectively other component, considered to be non-moving, in the region of the duct opening facing towards the moving duct component, since the duct component considered to be moving docks to this duct opening so to speak on approaching the first operating position. Through a short relative movement between the extension duct component and the base duct component this makes it possible to separate the extension duct from the base duct efficiently in fluid mechanical terms, since in this way the base duct component and the extension duct component when moving away from the first operating position towards the second operating position can be shifted not only axially along the common duct path in the connecting region of the two ducts but also away from each other with a movement component orthogonally hereto. In the preferential case of a rotationally guiding guidance arrangement, the rotation axis defined by the guidance arrangement is preferentially inclined to the duct paths of the duct components, i.e. non-parallel and non-orthogonal.

When the duct components are in the first operating position, the air intake device is in a first operating state with a longer intake duct. When the duct components are in the second operating position, the air intake device is in a second operating state with a shorter intake duct.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
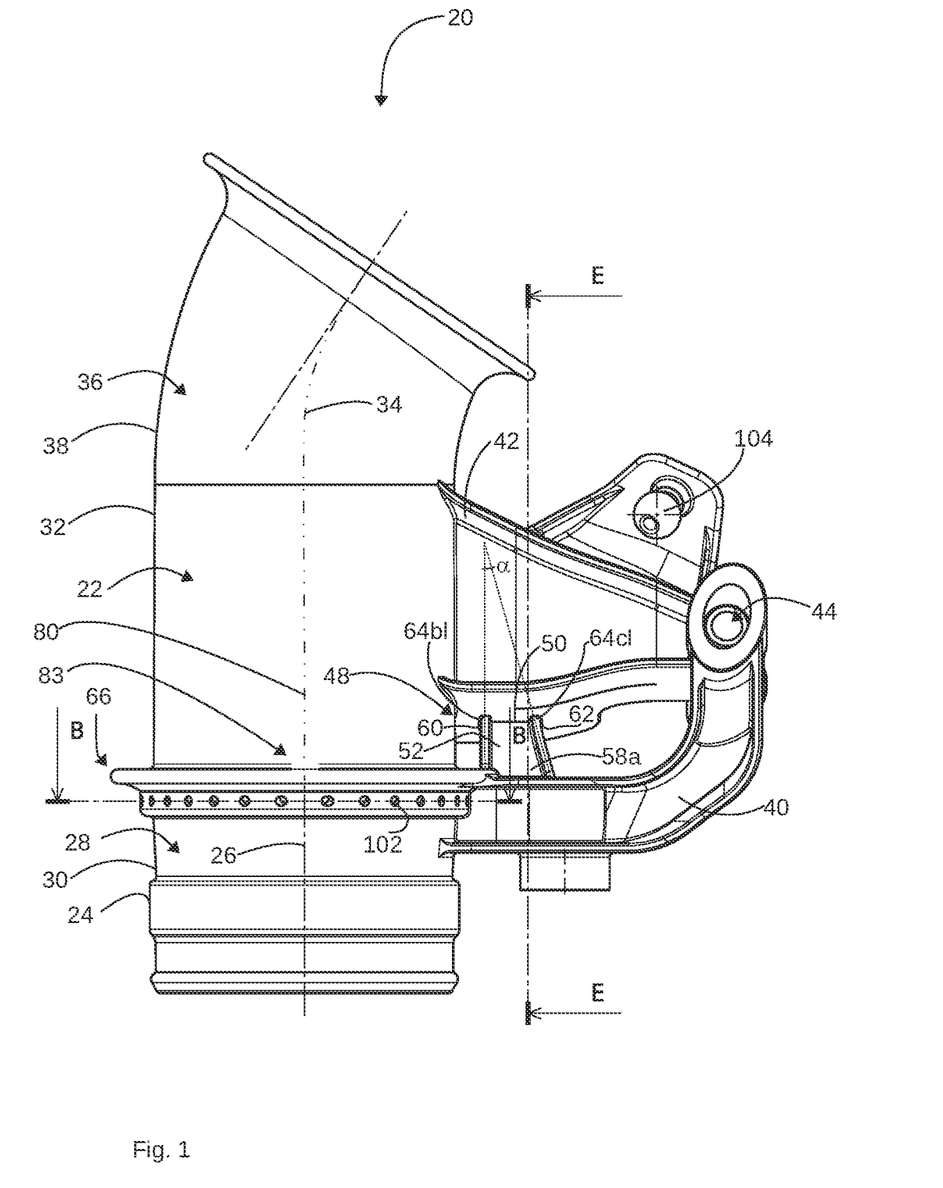
FIG. 1 A view of a first embodiment of an air intake device in a first operating state.

Referring now to the drawings wherein the showings are for the purpose of illustrating preferred and alternative embodiments of the invention only and not for the purpose of limiting the same, Figure (FIG. 1 shows an air intake device 20 with a variable-length intake duct 22 for an internal combustion engine 400 (see FIG. 7) with a base duct component 24, in which a hollow base duct 28 set up for conducting intake air and surrounded completely by its wall 30 extends along a virtual base duct path 26 proceeding centrally in it. The base duct 28 has in particular a round cross-section in a plane perpendicular to the base duct path 26, which can pass through the center of each of these round cross-sections. The air intake device 20 further comprises an extension duct component 32, in which a hollow extension duct 36 set up for conducting intake air and surrounded completely by its wall 38 extends along a virtual extension duct path 34 proceeding centrally in it. The extension duct 36 has in particular a round cross-section in a plane perpendicular to the extension duct path 34, which can pass through the center of each of these round cross-sections. The base duct component 24 comprises a base duct carrier arm 40 and the extension duct component 32 comprises an extension duct carrier arm 42, which are connected to each other pivotably through an axial-radial bearing 44 forming a guidance arrangement, such that the extension duct component 32 can be pivoted relative to the base duct component 24 about a pivot axis 46 passing centrally through the axial-radial bearing 44. This pivoting movement exhibits two end positions: a first operating position, shown in FIG. 1 and taking up which defines a first operating state of the air intake device 20, and a second operating position, shown in FIG. 2 and defined for example by an actuator or end stop. Taking up the second operating position defines a second operating state of the air intake device 20.

Figure 2:
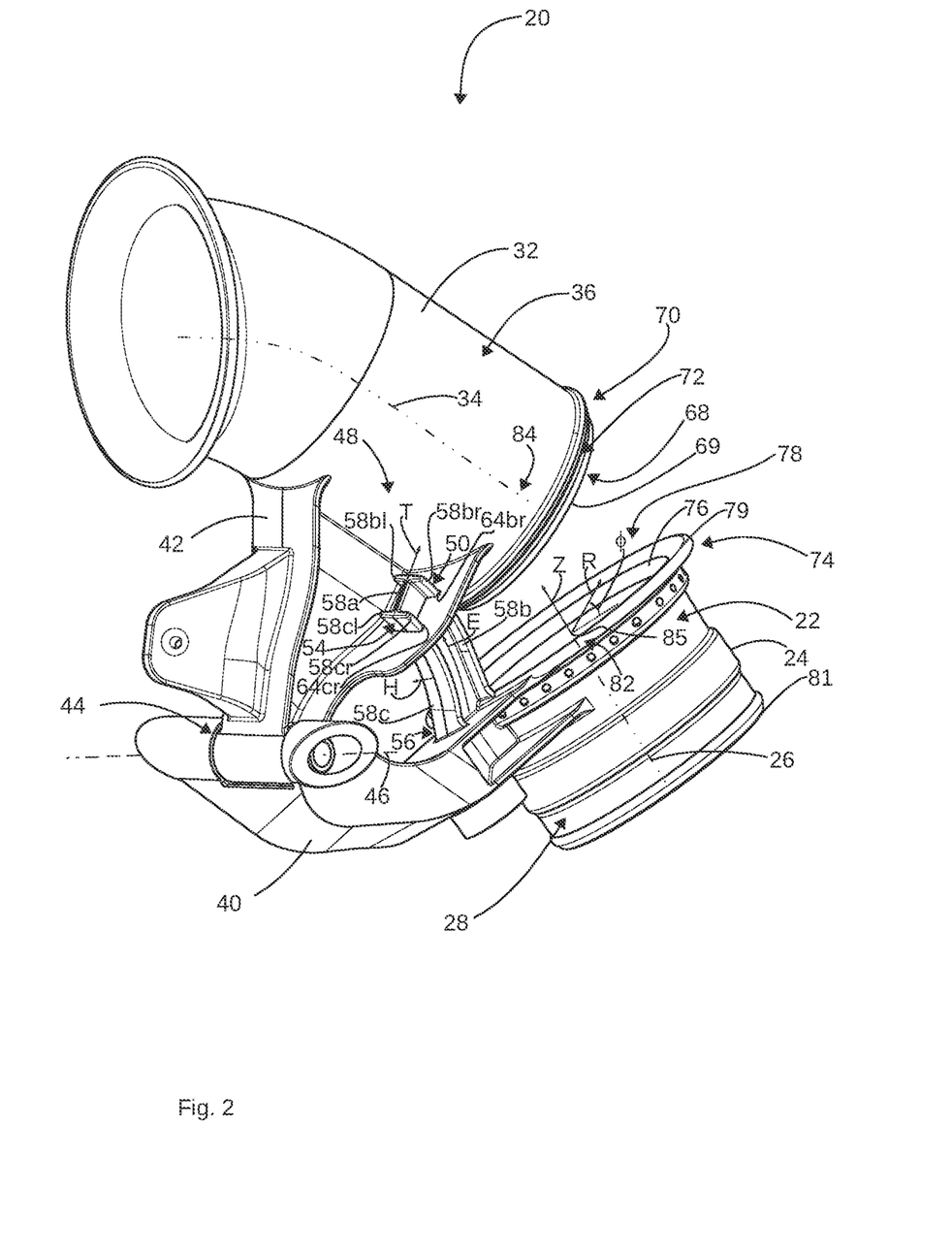
FIG. 2 The air intake device from FIG. 1 in a second operating state.
Figure 3:
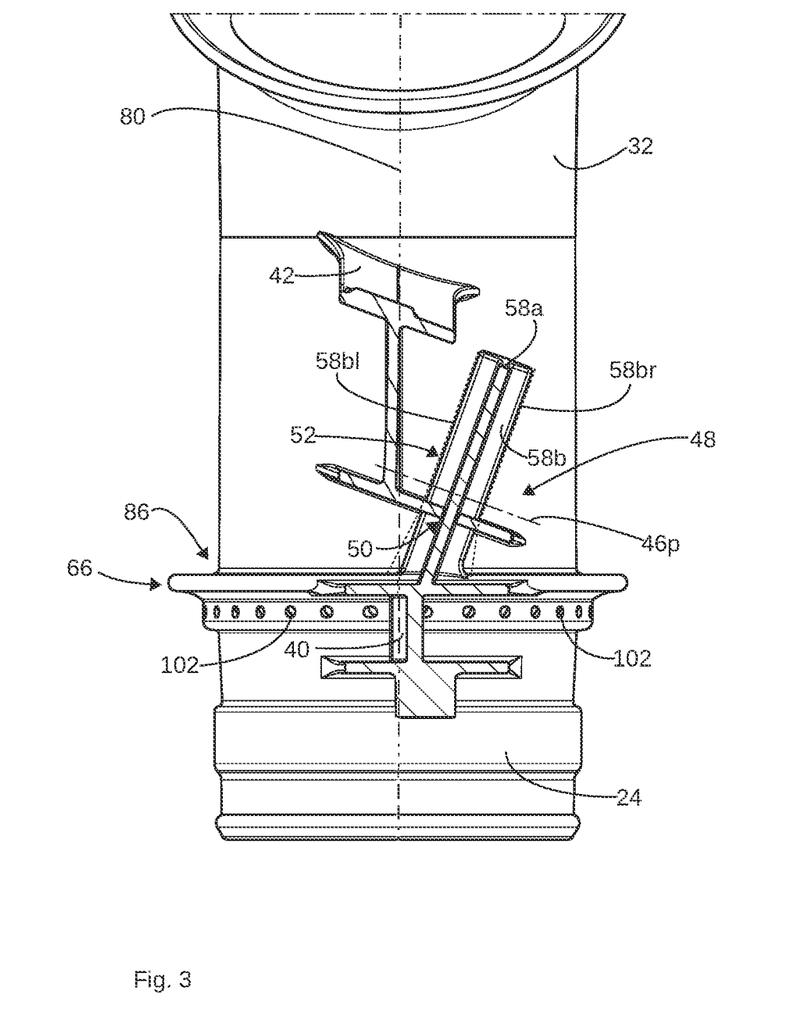
FIG. 3 An E-E section from FIG. 1.
Figure 4:
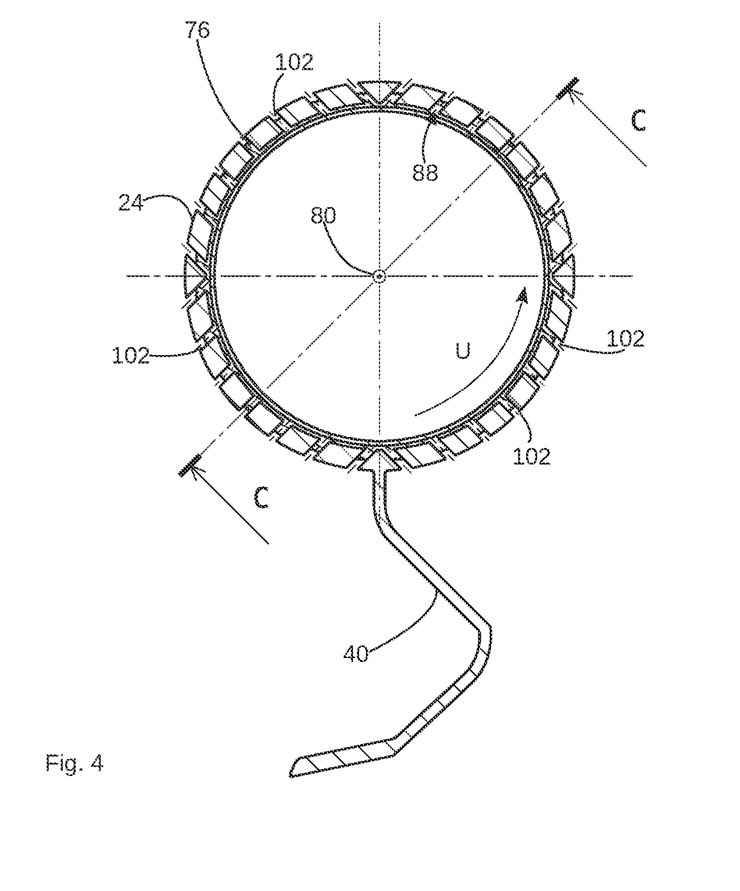
FIG. 4 A cut-out of a B-B section from FIG. 1.
Figure 5:
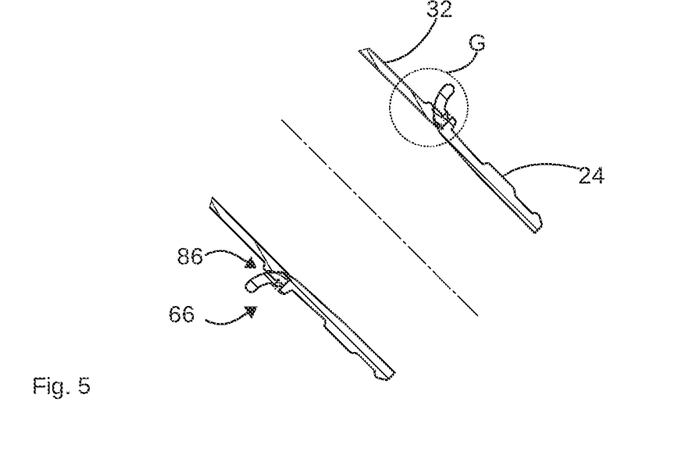
FIG. 5 A cut-out of a C-C section from FIG. 4, where the entire air intake device was intersected in the first operating state.
Figure 6:
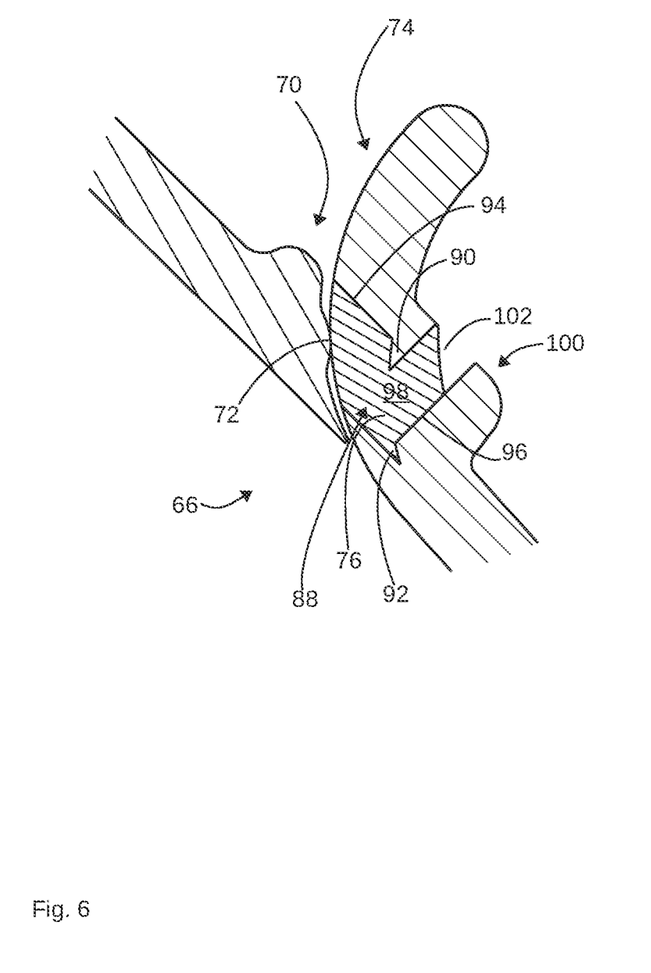
FIG. 6 An enlargement from the region G in FIG. 5.

The air intake device 20 comprises a first centering arrangement 48 especially well recognizable in FIGS. 2 and 3 with a centering socket 50 configured in the extension duct carrier arm 42, spaced away from the extension duct 36 and from the axial-radial bearing 44 and thus configured as separate, and with a centering spike 52 that is engaged with the centering socket 50 over the entire pivoting movement of the extension duct component 32 relative to the base duct component 24, configured integrally with the base duct carrier arm 40 and spaced away from the base duct 28 and from the axial-radial bearing 44 and thus configured as separate. The centering socket 50 and the centering spike 52 can form the centering arrangement 48.

The centering socket 50 is preferentially a passage aperture in the extension duct carrier arm 42 with a double-T shape transversely to the penetration direction of the extension duct carrier arm 42. The centering spike 52 exhibits in a direction transverse to, in particular perpendicular to, its direction of extension E a double-T-shaped cross-sectional area. The centering spike 52 exhibits a T-crosspiece 58a, which connects two T-bars 58b, 58c of the centering spike 52 arranged transversely to the T-crosspiece 58a with each other. The T-crosspiece 58a and the T-bars 58b, 58c extend further along the direction of extension E. The centering spike 52 exhibits a guiding region 54 located remotely from the base duct carrier arm 40, in which along the direction of extension E the cross-sectional area transversely to, in particular perpendicular to, the direction of extension E does not change, and a centering region 56 directly adjacent to the guiding region 54 in the direction of the base duct carrier arm 40, in which along the direction of extension E the cross-sectional area transversely to, in particular perpendicular to, the direction of extension E changes. The centering region 56 tapers along the direction of extension E, i.e. away from the base duct carrier arm 40, in at least one plane, for example in the plane defined by the two-dimensionally configured T-crosspiece 58a, as indicated by the angle α. In the first operating state, at least one, preferentially two sections of the T-bars 58b, 58c arranged in the centering region 56 lie against respective opposite inner surfaces 60, 62 of the centering socket 50, whereby a position of the centering spike 52 relative to the centering socket 50 in the direction of extension E and in the direction T parallel to the connection between the T-bars 58b, 58c realized through the T-crosspiece 58a is fixed. In the direction H running perpendicularly to the directions E and T, a position of the centering spike 52 is fixed through an abutment of at least one, preferentially two front faces 58b1, 58br, 58c1, 58cr of one and/or both of the T-bars 58b, 58c against respective inner surfaces 64b1, 64br, 64c1, 64cr of the centering socket 50 in the first operating state, wherein this abutment can be optionally supported and/or enforced through tapering in the direction of extension E of at least one, preferentially both T-bars 58b, 58c. A corresponding tapering course of the T-bar 58b in the direction E is indicated in FIG. 3 by a dotted line, wherein the T-bar 58c can just like the T-bar 58b be configured to be tapering. It should be noted that the directions E, T, and H should be considered locally, especially in the case of a curved centering spike 52. The interaction of the abutment of the sections of the T-bars 58b, 58c against the respective inner surfaces 60, 62 with the abutment of the front faces 58b1, 58br, 58c1, 58cr against the inner surfaces 64b1, 64br, 64c1, 64cr of the centering socket 50 and with the tapering of the centering spike 52 leads to a centering effect in the first operating state, through which the position of the centering spike 52 relative to the centering socket 50 is defined in the first operating state, whereby likewise the position of the extension duct component 32 relative to the base duct component 24 is defined in the first operating state. With analogous function, alternatively the centering socket 50 can be configured at the base duct carrier arm 40 and the centering spike 52 at the extension duct carrier arm 42.

As FIGS. 1 and 2 show, the air intake arrangement 20 comprises a contact arrangement 66 with a male insertion section 70 forming a contact formation and tapering at the outer circumference in the direction towards an aperture 68 of the extension duct 36, wherein the insertion section 70 comprises a gasket bearing surface 72 completely surrounding the extension duct 36 at the outer circumference and wherein the insertion section 70 forms part of the extension duct component 32. The aperture 68 lies at a longitudinal end 69 of the extension duct 36, which on approaching the first operating position between the extension duct component 32 and the base duct component 24 faces towards the base duct component 24. The contact arrangement 66 further comprises a female receiving section 74 forming a mating contact formation with a gasket 76 arranged at its inner circumference, wherein the receiving section 74 widens at its inner circumference in the direction towards an aperture 78 of the base duct 28, and wherein the gasket 76 surrounds the base duct path 26. The receiving section 74 is configured as part of the base duct component 24. The aperture 78 is located at a longitudinal end 79 of the base duct 28, which on approaching the first operating position between the extension duct component 32 and the base duct component 24 faces towards the extension duct component 32. The gasket 76 is arranged at a distance from the longitudinal end 79, however this distance is smaller than the distance between the gasket 76 and the second longitudinal end 81 of the base duct 28. In the first operating state, the gasket 76 lies against the gasket bearing surface 72, whereby the extension duct 36 lies directly against the base duct 28 and forms with it a common duct section 83, which in this embodiment coincides with the intake duct 22. In the first operating state the base duct path 26 and the extension duct path 34 merge into each other and form a virtual duct section path 80 which passes centrally through the common duct section 83, which passes through the contact arrangement 66. As can be seen in FIGS. 1 to 3, the first centering arrangement 48 is configured as separate and at a distance from the base duct 28, from the extension duct 36, and from the contact arrangement 66.

If the relative movement between the extension duct component 32 and the base duct component 24 is regarded in a local cylindrical coordinate system with a radial direction R, an angular direction 4), and a height direction Z, whose Z-origin lies at the end 85 of the virtual base duct path 26 and whose Z-axis continues the in particular as a straight line configured virtual base duct path 26 (or more generally continues it smoothly, in particular continuously differentiable at the Z-origin), then on the approach of the duct components 24, 32 to the first operating position the axial-radial bearing 44 guides the extension duct component 32 predominantly along the Z-axis close up to the base duct component 24, whist during this approach to the first operating position the first centering arrangement 48 through the centering effect described above decreases a radial distance between an end section 82 of the base duct path 26 facing towards the extension duct component 32 and an end section 84 of the extension duct path 34 facing towards the base duct component 24. This distance can be defined between the ends of the respective duct paths located in the end sections.

Due to the tapering shape of the insertion section 70 described above and the widening shape of the receiving section 74 described above, these sections form parts of a second centering arrangement 86, which on the approach of the duct components 24, 32 to the first operating position decreases a or the radial distance between the end section 82 and the end section 84.

The base duct component 24 is preferentially formed in a two-component injection molding process together with the gasket 76, wherein the receiving section 74 is formed using a first structural material (as a material of the mating contact formation), in particular a thermoplastic, e.g. polyethylene, in a first step of the two-component injection molding process with a groove 88 that in the first operating state surrounds the duct section path 80. In the groove 88 there is configured a projection 90 surrounding the base duct path 26 and extending essentially parallel to the R-direction and a recess 92 surrounding the base duct path 26 and extending essentially parallel to the Z-direction. The projection 90 and the recess 92 are respectively embodiments of anchoring formations. Furthermore, in the receiving section 74 there are configured a number of passage apertures 102 connecting an internal space 98 of the groove 88 with an outer side 100 of the base duct component 24 and distanced from each other in the circumferential direction U of the groove 88, which form anchoring recesses, wherein the passage apertures 102 are each essentially flush with the groove bottom 96 and each penetrates through a groove flank 94, wherein in the figures only a few of the passage apertures 102 are provided with a reference number. In a second step of the two-component injection molding process, the gasket 76 is formed, for example from a second structural material (as a material of the gasket 76), for example an elastomer, in particular a natural rubber or a synthetic rubber, in such a way that the projection 90 engages with and/or projects into the second structural material and/or that the second structural material engages with and/or projects into a number of or all of the recesses and/or passage apertures 92, 102. In a preferential embodiment, the second structural material exhibits a lower modulus of elasticity than the first structural material.

In order to effect the relative movement between the base duct component 24 and the extension duct component 32, an actuator arranged so as to be stationary relative to the base duct component 24 can engage with an engagement formation, in particular a ball joint 104. FIG. 3 shows a projection 46p of the pivot axis 46 perpendicular to the plane of the drawing, which projection intersects the depiction of the duct section path 80 in this drawing at an angle differing from 90 degrees, such that a plane of movement perpendicular to the pivot axis 46, in which plane the extension duct component 32 moves during the relative movement, intersects the duct section path 80 at a non-zero angle. Accordingly, during this relative movement the extension duct component 32 moves not only along the duct section path 80, but with a component perpendicular to the duct section path 80, in order to separate the extension duct component 32 through a relatively short movement efficiently from the base duct component 24. In the second operating state, only the base duct 28 forms the intake duct 22. In the first operating state, the intake duct 22 is longer than in the second operating state and it is formed by the base duct 28 and the extension duct 36.

Figure 7:
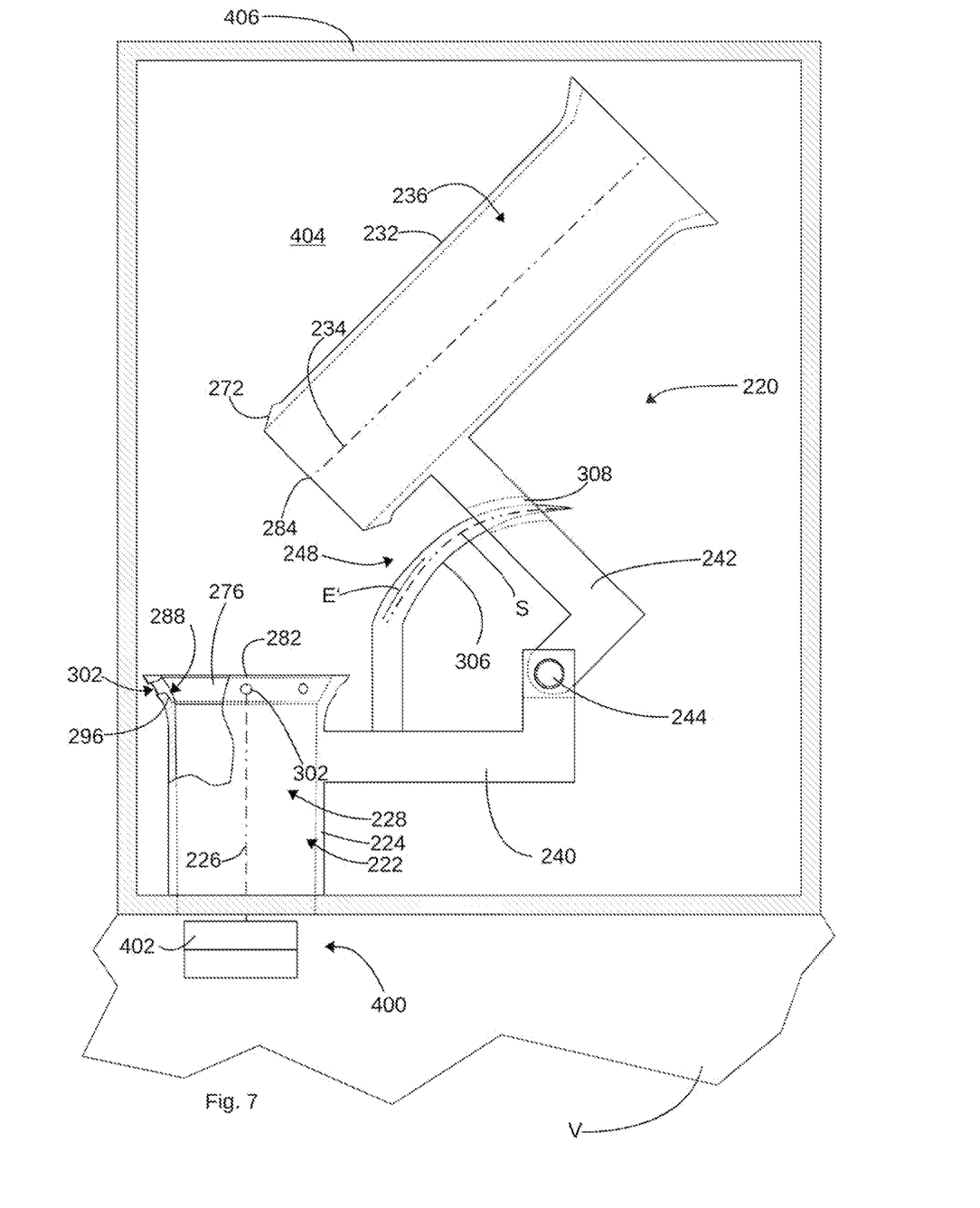
FIG. 7 A view of a second embodiment of an air intake device in the second operating state, partly shown as a section.

In analogy with the depiction of the second embodiment of the air intake device 220 in FIG. 7, in an intended operation of the air intake device 20 the base duct 28 is coupled in such a way to an internal combustion engine 400 of a vehicle V, e.g. a motor vehicle, that through the intake duct 22 the air intake device 20 is disposed for feeding air to a combustion chamber 402 of the internal combustion engine 400. The air intake device 20 can analogously to the air intake device 220 be arranged in an air-collection space 404 of the vehicle V, which is surrounded by a housing 406. It should be noted that the vehicle V, the engine 400 with its combustion chamber 402, and its coupling to the air intake device are shown only schematically in FIG. 7.

FIG. 7 shows a second embodiment of the air intake device, wherein in the following only the differences from the first embodiment are discussed. For a description of the further aspects of the second embodiment, reference is made to the description of the individual aspects of the first embodiment, which, despite schematic drawings being to hand, are realized or can be realized in the second embodiment also. Elements or parts of the air intake device 220 of the second embodiment, which correspond to analogous or identical elements or parts of the first embodiment, are always assigned a reference number higher by 200 than the reference number in the first embodiment and reference is made to their description in the first embodiment.

The air intake device 220 comprises a first centering arrangement 248 with a curved centering spike 306 configured integrally with the base duct carrier arm 240, which exhibits a round (indicated by the central axis S) and/or oval cross-sectional area perpendicular to its direction of extension E, and a centering socket 308 configured in the extension duct carrier arm 242, configured such that in the first operating state of the air intake device 220 the inner surface of the centering socket 308 lies essentially full-faced against the outer surface of the centering spike 306. Furthermore, in the groove 288 that accommodates the gasket 276 there are configured passage apertures 302, which penetrate through the groove bottom 296. Whereas in the first embodiment the extension duct component 32 exhibits in part a curved extension duct path 34, the extension duct path 234 is a straight line.

In the first embodiment, the first centering arrangement 248 can replace the first centering arrangement 48, and vice versa.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air intake device with a variable-length intake duct for an internal combustion engine, comprising:
a base duct component with a base duct extending along a virtual base duct path, configured for the passage of intake air along the base duct path through the base duct component, wherein the base duct path is conceived as passing centrally through the base duct,
an extension duct component with an extension duct extending along a virtual extension duct path, configured for the passage of intake air along the extension duct path through the extension duct component, wherein the extension duct path is conceived as passing centrally through the extension duct,
a guidance arrangement, which guides the extension duct component and the base duct component to a relative movement between a first operating position and a second operating position, wherein in the first operating position the base duct and the extension duct form, in mutually prolonging abutment, a continuous common duct section extending along the base duct and the extension duct as part of the intake duct, and wherein in the second operating position the extension duct is arranged at a distance from the base duct, such that only the base duct forms part of the intake duct, and a first centering arrangement, configured on the approach of the duct components to the first operating position to decrease a radial distance in relation to the base duct path between an end section of the base duct path facing towards the extension duct component and an end section of the extension duct path facing towards the base duct component,
the first centering arrangement is configured as separate from the base duct and from the extension duct.

2. The air intake device according to claim 1, wherein the first centering arrangement is arranged spatially between the guidance arrangement on the one hand and the base duct and the extension duct on the other.

3. The air intake device according to claim 1, further comprising a contact arrangement with a contact formation and a mating contact formation, wherein in the first operating position the abutment between the base duct and the extension duct is configured as abutment of the contact formation against the mating contact formation, and wherein in the first operating state the contact formation and the mating contact formation are passed through by the common duct section.

4. The air intake device according to claim 3, wherein the first centering arrangement is configured at a distance from the contact arrangement.

5. The air intake device according to claim 3, wherein the contact arrangement comprises a second centering arrangement configured as separate from the first centering arrangement, configured on the approach of the duct components to the first operating position to decrease a radial distance in relation to the base duct path between the end section of the base duct path facing towards the extension duct component and the end section of the extension duct path facing towards the base duct component.

6. The air intake device according to claim 5, wherein the contact arrangement comprises a gasket bearing surface configured at the contact formation and a gasket arranged at the mating contact formation, wherein in the first operating position the gasket bearing surface is in contact with the gasket.

7. The air intake device according to claim 3, wherein the contact arrangement comprises a gasket bearing surface configured at the contact formation and a gasket arranged at the mating contact formation, wherein in the first operating position the gasket bearing surface is in contact with the gasket.

8. The air intake device according to claim 7, wherein the gasket is arranged at a distance from a longitudinal end nearer to the gasket of the duct of the duct component carrying the gasket.

9. The air intake device according to claim 8, wherein the gasket is arranged in a groove that in the first operating position surrounds the common duct section.

10. The air intake device according to claim 7, wherein the gasket is arranged in a groove that in the first operating position surrounds the common duct section.

11. The air intake device according to claim 10, wherein the groove exhibits at least one anchoring recess arranged at a distance from each other in the circumferential direction of the groove.

12. The air intake device according to claim 11, wherein the gasket engages with the anchoring recess.

13. The air intake device according to claim 11, wherein the groove exhibits a number of anchoring recesses and at least one of the number of anchoring recesses penetrates through a surface bounding the groove.

14. The air intake device according to claim 13, wherein the at least one of the number of anchoring recesses penetrates through a groove bottom or a groove flank.

15. The air intake device according to claim 6, wherein the material of the gasket exhibits a lower modulus of elasticity than the material of the mating contact formation.

16. The air intake device according to claim 11, wherein the material of the gasket exhibits a lower modulus of elasticity than the material of the mating contact formation.

17. The air intake device according to claim 1, wherein the first and second operating position are each end positions of the relative movement of the extension duct component and of the base duct component, wherein the first centering arrangement comprises a centering socket and a centering spike configured for engaging with the centering socket.

18. The air intake device according to claim 17, wherein the centering spike is configured for engaging with the centering socket over at least 15% of the relative movement between its end positions.

19. The air intake device according to claim 17, wherein the centering spike is configured for engaging with the centering socket over at least 75% of the relative movement between its end positions.

20. The air intake device according to claim 1, wherein the relative movement of the extension duct component and of the base duct component proceeds in parallel to a plane of movement, wherein in the first operating state this plane of movement is intersected by a virtual duct section path conceived as passing centrally through the common duct section at a non-zero angle.

* * * * *